(12) United States Patent
Kim et al.

(10) Patent No.: US 9,430,084 B2
(45) Date of Patent: Aug. 30, 2016

(54) APPARATUS AND METHOD FOR EXECUTING FUNCTIONS RELATED TO HANDWRITTEN USER INPUT ON LOCK SCREEN

(71) Applicant: SAMSUNG ELECTRONICS CO., LTD., Suwon-si (KR)

(72) Inventors: Sang-Ho Kim, Hwaseong-si (KR); Mu-Sik Kwon, Seoul (KR); Do-Hyeon Kim, Suwon-si (KR); Dong-Hyuk Lee, Seoul (KR); Seong-Taek Hwang, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 14/472,503

(22) Filed: Aug. 29, 2014

(65) Prior Publication Data

US 2015/0062041 A1 Mar. 5, 2015

(30) Foreign Application Priority Data

Aug. 29, 2013 (KR) .................. 10-2013-0103242

(51) Int. Cl.
*G06F 3/041* (2006.01)
*H04M 1/67* (2006.01)
(Continued)

(52) U.S. Cl.
CPC ......... *G06F 3/0416* (2013.01); *G06F 3/03545* (2013.01); *G06F 3/0412* (2013.01);
(Continued)

(58) Field of Classification Search
CPC .. G06F 3/044; G06F 3/0416; G06F 3/04883; G06F 3/041; G06F 3/04847; G06F 3/0488; G06F 3/04886; G06F 21/36; H04M 2250/22
USPC ........... 345/173, 174, 156; 340/572.9, 5.31; 715/763, 773
See application file for complete search history.

(56) References Cited

U.S. PATENT DOCUMENTS 8,504,842 B1 * 8/2013 Meacham ............. G06F 3/0488
    713/182
8,532,596 B1 * 9/2013 Park ...................... G06F 3/0481
    345/173

(Continued)

FOREIGN PATENT DOCUMENTS

CN     102968262 A     3/2013
EP     2 256 610 A1     12/2010

(Continued)

OTHER PUBLICATIONS

Szabolcs Ignacz, "Android ICS 4.0.4 on Samsung Galaxy Note (Pop-Up play, Signature Unlock)", Published on Jul. 16, 2012, [Video file]. Retrieved from https://youtu.be/5IUDksBhhWg].*

(Continued)

*Primary Examiner* — Koosha Sharifi-Tafreshi
(74) *Attorney, Agent, or Firm* — Sughrue Mion, PLLC

(57) ABSTRACT

Apparatuses and methods are provided for executing a function corresponding to a handwritten user input at the same time as providing a handwritten unlock command on a lock screen of an electronic device. The apparatus includes a touch screen that displays a lock screen including a first layer for unlocking the lock screen and a second layer that is laid over the first layer, and a controller that verifies that an unlock command is the same as a predetermined unlock command in response to the unlock command being input to the first layer, to display the second layer in response to the unlock command being the same as the predetermined unlock command, and to search for a command corresponding to a handwritten user input that is input to the second layer to execute the command.

21 Claims, 15 Drawing Sheets

(51) Int. Cl.
  *G06F 3/0488* (2013.01)
  *G06F 21/31* (2013.01)
  *G06F 3/0354* (2013.01)
  *G06F 21/32* (2013.01)
  *G06F 21/36* (2013.01)

(52) U.S. Cl.
  CPC ........... *G06F3/04883* (2013.01); *G06F 21/31* (2013.01); *H04M 1/67* (2013.01); *G06F 21/32* (2013.01); *G06F 21/36* (2013.01); *G06F 2203/04804* (2013.01); *H04M 2250/22* (2013.01)

(56) References Cited

U.S. PATENT DOCUMENTS

| | | | |
|---|---|---|---|
| 2004/0203594 A1 | 10/2004 | Kotzin et al. | |
| 2010/0026642 A1 | 2/2010 | Kim et al. | |
| 2010/0162182 A1* | 6/2010 | Oh | G06F 3/04883 715/863 |
| 2010/0306718 A1* | 12/2010 | Shim | G06F 3/04883 715/863 |
| 2011/0041102 A1 | 2/2011 | Kim | |
| 2011/0300831 A1* | 12/2011 | Chin | G06F 1/3203 455/411 |
| 2011/0302515 A1* | 12/2011 | Kim | G06F 3/0482 715/768 |
| 2012/0319959 A1 | 12/2012 | Saponas et al. | |
| 2013/0263251 A1* | 10/2013 | Fleizach | G06F 3/04883 726/19 |
| 2013/0263254 A1* | 10/2013 | Seo | G06F 21/32 726/19 |
| 2014/0145821 A1* | 5/2014 | Wang | G07C 9/00142 340/5.54 |
| 2014/0283112 A1* | 9/2014 | Wang | G06F 21/84 726/27 |

FOREIGN PATENT DOCUMENTS

| | | |
|---|---|---|
| EP | 2 285 077 A2 | 2/2011 |
| KR | 10-2007-0066548 A | 6/2007 |
| KR | 10-2010-0013539 A | 2/2010 |
| WO | 98/19292 A1 | 5/1998 |

OTHER PUBLICATIONS

Communication, Issued by the European Patent Office, Dated Nov. 28, 2014, in counterpart 14182790.7.

* cited by examiner

| HANDWRITING DATA | COMMAND |
|---|---|
| C | EXECUTE CAMERA PROGRAM |
| ? | EXECUTE DICTIONARY SEARCH PROGRAM |
| ☆ | EXECUTE HANDWRITING NOTE PROGRAM |
| e | EXECUTE WEB SEARCH PROGRAM |
| T | EXECUTE TRANSLATION PROGRAM |
| m | EXECUTE MESSAGE SEND PROGRAM |
| g | EXECUTE GOOGLE SEARCH PROGRAM |

FIG.12

APPARATUS AND METHOD FOR EXECUTING FUNCTIONS RELATED TO HANDWRITTEN USER INPUT ON LOCK SCREEN

CROSS-REFERENCE TO RELATED APPLICATION

This application claims the benefit under 35 USC §119(a) of Korean Patent Application No. 10-2013-0103242, filed in the Korean Intellectual Property Office on Aug. 29, 2013, the entire disclosure of which is hereby incorporated by reference.

BACKGROUND

1. Field

Apparatuses and methods consistent with exemplary embodiments relate to a method and apparatus for executing a function associated with handwriting data that is input by a user on a lock screen of an electronic device.

2. Description of Related Art

An electronic device equipped with a touch screen includes various types of input device-lock/unlock functions to prevent unnecessary input errors while in an idle state or to prevent unauthorized users from using the electronic device. Generally, the electronic device executes a lock function after activation of the lock function is selected by a user.

When the lock function is set, the lock function may be activated when there is no input from a user for a predetermined amount of time. Accordingly, when the user uses a predetermined function of the electronic device or otherwise makes an input within the predetermined period of time, the screen or the function of the electronic device may remain unlocked. In general, an electronic device unlocks the electronic device from the lock mode based on a predetermined method for cancelling the lock mode, for example, according to a touch screen hold state, and the like, of the touch screen of the electronic device.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

Conventionally, when a user of an electronic device cancels a lock mode, a home screen or a recently used application is loaded and displayed. As another example, if a function has not been used recently by the electronic device, the electronic device may enter into an initial menu. In the case in which the electronic device enters into the lock mode while a function is open or already being used, a recently used application is displayed when the lock mode is switched back to an unlock state.

According to the related method, in response to the lock mode being cancelled, a home screen or a recently used application is displayed. However, if a user desires to use a predetermined function in the state in which the electronic device is locked or in a deactivated state, a user must execute a menu access process for selecting and executing a desired function only after cancelling the lock mode based on a predetermined unlock method, which is inconvenient for the user.

Accordingly, one or more exemplary embodiments provide a method and apparatus for readily and promptly executing a user's desired application while exiting from a lock mode. In addition, one or more exemplary embodiments provide a method and apparatus for providing a lock mode that prevents a portable terminal from being used by an unauthorized third party, and for immediately activating a predetermined application at the same time as unlocking. One or more exemplary embodiments further provide a method and apparatus for executing a function corresponding to a handwritten user input at the same time as providing a handwritten unlock command on a lock screen of an electronic device.

According to an aspect of an exemplary embodiment, there is provided an apparatus for executing a function associated with a handwritten user input on a lock screen. The apparatus includes a touch screen that displays a lock screen that includes a first layer for unlocking the lock screen and a second layer that is laid over the first layer, and a controller that verifies that an unlock command is the same as a predetermined unlock command in response to the unlock command being input to the first layer of the lock screen, to display the second layer in response to the unlock command being the same as the predetermined unlock command, and to search for a command corresponding to a handwritten user input that is input to the second layer of the lock screen to execute the command.

According to an aspect of another exemplary embodiment, there is provided a method of executing a function associated with a handwritten user input on a lock screen. The method includes displaying a lock screen that includes a first layer for unlocking the lock screen and a second layer that is laid over the first layer; activating the second layer in response to a predetermined unlock command being input through the first layer, searching for a command corresponding to a handwritten user input that is input through the second layer of the lock screen, and executing the command corresponding to the handwritten user input.

According to an aspect of another exemplary embodiment, there is provided an apparatus for executing a function associated with a handwritten user input on a lock screen. The apparatus includes a touch screen that displays a lock screen that includes a first area for unlocking the lock screen and a second area for executing a command, and a controller that verifies that an unlock command is the same as a predetermined unlock command in response to the unlock command being input to the first area of the lock screen, to search for a command corresponding to a handwritten character that is input to the second area of the lock screen, and to execute the command corresponding to the handwritten character in response to the unlock command being the same as the predetermined unlock command.

According to an aspect of another exemplary embodiment, there is provided a method of executing a function associated with a handwritten user input on a lock screen. The method includes displaying a lock screen that includes a first area for unlocking and a second area for executing a command, receiving a user input is provided by a user input means on a first area of the lock screen and the second area of the lock screen, verifying whether the user input on the first area of the lock screen is the same as a predetermined unlock, searching for a command corresponding to the user input provided on the second area of the lock screen in response to the user input of the first area being the same as the predetermined unlock command, and executing the command corresponding to the user input received on the second area of the lock screen.

According to various aspects, a quick execution of a predetermined application is capable of being performed at the same time as an unlocking operation, and thus, there is an increase in the convenience of using an electronic device.

According to various aspects, a lock method using a unique handwritten signature known by only an authorized user of an electronic device is provided. Accordingly, the security of an electronic device is enhanced, and the user may utilize a desired function by inputting the desired function through handwriting on a touch screen.

BRIEF DESCRIPTION OF THE DRAWINGS

The above and/or other aspects will be more apparent from the following detailed description taken in conjunction with the accompanying drawings, in which:

FIG. 12 illustrates a table showing various handwriting commands according to an exemplary embodiment.

DETAILED DESCRIPTION

Figure 1:
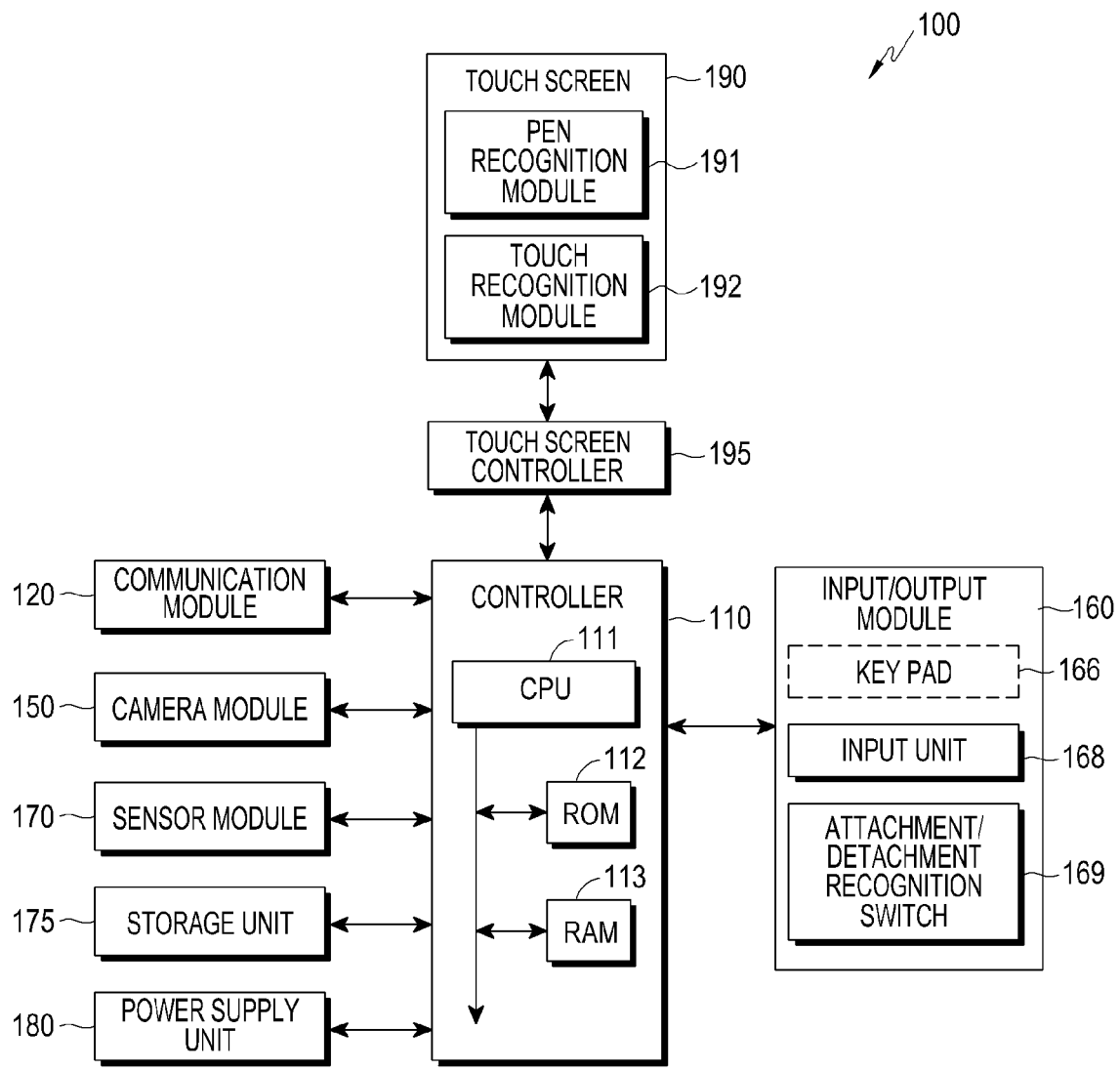
FIG. 1 is a block diagram illustrating an electronic device according an exemplary embodiment.

The detailed description of the present disclosure is given below with reference to the accompanying drawings illustrated for specific embodiments implementing the present disclosure as examples. The embodiments will be described in detail such that those skilled in the art may carry out the present disclosure. It should be understood that although various embodiments of the present disclosure are different from each other, they need not be mutually exclusive. For example, specific forms, structures, and characteristics described herein may be realized through another embodiment without departing from the spirit and scope of the present disclosure.

Furthermore, it should be understood that locations or arrangements of separate elements within the disclosed embodiments can be changed without departing from the spirit and scope of the present disclosure. Accordingly, the detailed descriptions given below are not intended to be restrictive, and the scope of the present disclosure should be limited only by the accompanying claims and equivalents thereof. Similar reference numerals shown in the drawings denote members performing an identical or similar function in several aspects.

Although the terms including an ordinal number such as first, second, and the like, may be used for describing various elements, the structural elements are not restricted by the numerical terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

The terms used herein are merely used to describe specific embodiments, and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined differently, all terms used herein, which include technical terminologies or scientific terminologies, have the same meaning as that understood by a person skilled in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present disclosure, an electronic device may be a device such as a tablet, a laptop, a television, a computer, an appliance, and the like. For example, the electronic device may be a smart phone, a portable phone, a game player, a television (TV), a display device, a head-up display unit for a vehicle, a notebook computer, a laptop computer, a tablet computer, a Personal Media Player (PMP), a Personal Digital Assistants (PDA), a navigation unit, an ATM for banking, a point of sale (POS) for a store, and the like. Further, the electronic device may be a flexible device or a flexible display unit.

A representative structure of the electronic device is referred to herein as a portable phone. It should be appreciated that some structural elements of the representative structure of the electronic device may be omitted or modified if necessary.

Referring to FIG. 1, electronic device 100 includes a touch screen 190 and at least one touch screen controller 195. For example, a display unit and a display controller may correspond to the touch screen 190 and the touch screen controller 195, respectively. Also, the electronic device 100 includes a controller 110, a communication module 120, a camera module 150, an input/output module 160, a sensor module 170, a storage unit 175, and a power supply unit 180.

The controller 110 includes a central processing unit (CPU) 111, a read-only memory (ROM) 112 that may be used to store a control program for controlling the electronic device 100, and a random-access memory (RAM) 113 that may be used as a storage area for storing a signal or data input from the outside of the electronic device 100 or for work performed in the electronic device 100. The CPU 111 may include multiple cores such as a dual core, a triple core, a quadruple core, and the like, in addition to a single core. The CPU 111, the ROM 112, and the RAM 113 may be connected to each other through an internal bus.

The input/output module 160 includes a keypad 166, an input unit 168, and an attachment/detachment recognition switch 169.

The controller 110 may control the communication module 120, the camera module 150, the input/output module 160, the sensor module 170, the storage unit 175, the power supply unit 180, the touch screen 190, and the touch screen controller 195.

The controller 110 may detect a user input being input to the input unit 168 or a touchable user input means, such as a user's finger. In response to touching or approaching an object or being located close to the object in a state in which a plurality of objects or items are displayed on the touch screen 190, the controller 110 may identify an object corresponding to a position of the touch screen 190 where the user input is generated. The user input through the touch screen 190 may include a direct touch input that directly touches the object and a hovering input corresponding to an indirect touch input that approaches the object within a preset recognition range but does not directly touch the object. For example, when the input unit 168 is located close to the touch screen 190, an object located directly under the input unit 168 may be selected. As another example, a user input may include a gesture input through the camera module 150, a switch/button input through a button or a key pad 166, a speech input through a microphone, and the like, in addition to the user input through the touch screen 190.

The controller 110 may display a lock screen on the touch screen 190 when a user input for activating the electronic device 100 that has a screen that is turned off or locked is sensed. According to various aspects, the lock screen may include a first layer for receiving an unlock command and a second layer which is laid over the first layer and is used for receiving a handwritten user input. The first layer and the second layer overlap and may be displayed on an identical or similar display areas. As another example, the lock screen may include a first area for receiving an unlock command and a second area for receiving a handwritten user input. For example, the unlock command may be a handwritten signature, an unlock pattern, a password, and the like.

The user input may be a handwritten character, an alphanumeric character, a symbol included in a lateral symbol system, and the like. As another example, the user input may be a unique object or item generated by a user. For example, the user may draw an image, text, or the like, so as to generate the unique object or item. Accordingly, the user may generate a unique object or item and set a link between the object and a desired application. In this example, only the user may be aware of the application connected to the object. As a result, the access of other users that are not aware of this unique object may be prevented and the privacy of a user may be further protected. Accordingly, the security of an electronic device may be enhanced, and the user may directly enter into a desired function, in the same way as through a user interface, thereby improving the convenience of the user.

The controller 110 executes the unlocking when a predetermined unlock command is input through the first layer of the lock screen. Accordingly, the controller 110 displays the second layer that is laid over the first layer, to induce inputting a written user input. In this example, when a handwritten user input is sensed on the second layer, the controller 110 searches for a command corresponding to the user input, and executes the retrieved command.

When an unlock command input through the first area of the lock screen is the same as a predetermined unlock command, the controller 110 executes unlocking. A handwritten user input may be sensed through the second area of the lock screen, and the controller 110 may search for and execute a command corresponding to the user input. In this example, when an unlock command is input, the controller 110 executes unlocking, and simultaneously executes the retrieved command and displays a screen associated with the execution of the command on the touch screen 190. In this example, the command is executed after the predetermined unlock command is input, however, the commands may be input in a different order or at the same time. Accordingly, an order of receiving an unlock command through the first area and receiving a handwritten user input through the second area is not limited.

When a handwritten user input is not sensed in a state in which the predetermined unlock command is input, the controller 110 may display an unlock screen on the touch screen 190. For example, the controller 110 may determine whether a handwritten user input is sensed on the second layer or the second area, within a predetermined period of time, in the state in which the unlock command is input. If a handwritten user input is not sensed within the predetermined period of time, an unlock screen such as a home screen or a screen of a previously executed application may be output. As described above, and according to various aspects, a user may execute a function for unlocking a locked screen, and simultaneously execute a desired application or function.

The communication module 120 may include at least one of a mobile communication module, a wireless LAN module, a short distance communication module, and the like.

The camera module 150 may include one camera or two or more cameras that capture a still image or a video based on a control of the controller 110.

The input/output module 160 may include at least one of the keypad 166 and the input unit 168. Alternatively, the input/output module 160 may not include a keypad 166. The input/output module 160 may also include a cursor control such as a mouse, a track ball, a joystick, cursor direction keys, and the like, which may be provided to control a movement of a cursor on the touch screen 190.

The keypad 166 may receive a key input from a user to control the electronic device 100. The keypad 166 may include a physical keypad formed in the display device 100 or a virtual keypad displayed on the touch screen 190.

The input unit 168 is an example of a user input means. In one area inside the electronic device 100 where the input unit 168 is inserted, an attachment/detachment recognition switch 169 is included, which operates in response to the attachment and detachment of the input unit 168. For example, the attachment/detachment recognition switch 169 may output, to the controller 110, a signal corresponding to the attachment/detachment of the input unit 168. The attachment/detachment recognition switch 169 may be configured to be in direct/indirect contact with the input unit 168 when the input unit 168 is mounted. Accordingly, the attachment/detachment recognition switch 169 may generate a signal corresponding to the attachment or detachment of the input unit 168, that is, a signal identifying attachment or detachment of the input unit 168, based on whether the attachment/ detachment recognition switch 169 is in contact with the input unit 168, and may output the generated signal to the controller 110.

The sensor module 170 includes at least one sensor for detecting an ambient circumstance of the electronic device 100. For example, the sensor module 170 may include a proximity sensor for detecting whether the user approaches the electronic device 100, an illuminance sensor for detecting an amount of ambient light around the electronic device 100, a motion sensor for detecting motion such as rotation, acceleration, or vibration of the electronic device 100, a geo-magnetic sensor for detecting a point of the compass of the electronic device 100 using the Earth's magnetic field, a gravity sensor for detecting a gravity action direction, an altimeter for measuring an atmospheric pressure to detect an altitude, a GPS module 157, and the like.

The storage unit 175 may store a signal or data input/output according to an operation of the communication module 120, the camera module 150, the input/output module 160, the sensor module 170, the touch screen 190, and the like, based on a control of the controller 110. The storage unit 175 may store a control program and applications for controlling the electronic device 100 or the controller 110.

The term storage unit may refer to a data storing device such as the storage unit 175, the ROM 112, and the RAM 113, a memory card (for example, an SD card, a memory stick or the like) inserted into the electronic device 100, and the like. The storage unit 175 may also include a non-volatile memory, a volatile memory, a Hard Disk Drive (HDD), a Solid State Drive (SSD), or other memory storage device.

The storage unit 175 may also store various applications such as navigation, video calls, games, time-based alarm applications, and the like. The storage unit 175 may also store images to provide a Graphical User Interface (GUI) related to the applications, databases or data related to user information, documents and methods for processing a touch input, background images (for example, a menu screen, an idle screen, or the like), operating programs for operating the electronic device 100, images captured by the camera module 150, and the like.

Further, the storage unit 175 may also store data associated with at least one function corresponding to a handwritten character, and the like, that a user may input on a screen. Further, the storage unit 175 stores an unlock command, and may store a handwritten signature or a plurality of handwritten signatures of the unlock command. Accordingly, the storage unit 175 may store feature values of property information utilized for handwritten signature verification. For example, a real handwritten signature motion of the user may be converted into a digital image and may be stored. The storage unit 175 may receive the unique handwritten signature of the corresponding user, and store a trajectory of a handwriting style of the handwritten signature as a reference handwritten signature.

The storage unit 175 may be a machine such as a computer-readable medium, and may be defined as a medium for providing data to the machine so that the machine performs a specific function. The storage unit 175 may include a non-volatile medium and a volatile medium. For example, the media may be tangible so that commands transferred by the media are detected by a physical means through which the machine reads the commands.

The machine-readable medium may include at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), a flash-EPROM, and the like.

The power supply unit 180 may supply electric power to one or more batteries disposed in a housing of the electronic device 100 under a control of the controller 110. The one or more batteries supply the electric power to the electronic device 100. Further, the power supply unit 180 may supply power input from an external power source through a wired cable connected to a connector to the electronic device 100. As another example, the power supply unit 180 may also supply the electric power that is wirelessly input and received from an external electric power source through a wireless charging technology.

The touch screen 190 may provide user graphical interfaces corresponding to various services, for example, a phone call, data transmission, broadcasting, photography, and the like, to the user. The touch screen 190 may include a display panel that displays information output from the electronic device 100, and an input panel that inputs various inputs by a user. For example, the display panel may include a liquid crystal display (LCD) panel, an active-matrix organic light-emitting diode (AMOLED) panel, and the like. The display panel may display various screens in association with various operation states of the electronic device 100, the execution of an application, a service, and the like. For example, the display panel may display a handwritten input of a user which the user makes by drawing on a screen with a finger or while holding a pen in a hand, for verification of a signature.

The input panel may include at least one panel that may sense a single or multi-touch input, a drag input, a writing input, a drawing input, and the like, performed by a user using various objects such as a finger, a pen, and the like. For example, the input panel may include a single panel which is capable of sensing both a finger input and a pen input, or may include two panels such as a touch recognition module 192 that is capable of sensing a finger input and a pen recognition module 191 that is capable of sensing a pen input.

The touch screen 190 may output, to the touch screen controller 195, an analog signal corresponding to a user input which is input to a user graphical interface. The touch screen 190 may receive the user input via a body part of a user, for example, an index finger, and the like. The touch screen 190 may also receive successive motions of one touch. The touch screen 190 may output, to the touch screen controller 195, an analog signal corresponding to the successive motions of an input touch.

The touch described in exemplary embodiments is not limited to a contact between the touch screen 190 and a user input means, such as a finger or the like, and may include a non-contact or indirect contact. For example, a user input means may detect input within a recognition distance such as 1 cm away, and the user input may be detected without a direct contact with the touch screen 190. A distance or interval within which the user input means may be recognized by the touch screen 190 may be changed according to a performance or structure of the electronic device 100. The touch screen 190 may output different values for a value detected by a direct touch event and a value detected by a hovering event, so that the direct touch event can be distinguished from the indirect touch event. For example, the direct touch event and the indirect touch event may be distinguished by the touch screen based on a detected current or a detected voltage. Also, the touch screen 190 may be a capacitive type, an infrared type, an acoustic wave type, a combination thereof, and the like.

The touch screen controller 195 converts an analog signal input from the touch screen 190 to a digital signal and transmits the converted digital signal to the controller 110. The controller 110 may control a user interface displayed on the touch screen 190 using a digital signal received from the touch screen controller 195. For example, the controller 110 may allow a shortcut icon or an object displayed on the touch screen 190 to be selected or executed in response to a direct touch event or a hovering event. In some examples, the touch screen controller 195 may be integrated with the controller 110.

The touch screen controller 195 may determine a hovering interval or distance in addition to a position of the user input by detecting a value, for example, a current value or the like, output through the touch screen 190. The touch screen controller 195 may convert the determined distance value to a digital signal, for example, a Z coordinate, to provide the converted digital signal to the controller 110. The controller 110 may also detect various user inputs received through the camera module 150, the input/output module 160, the sensor module 170, and the like, in addition to the touch screen 190. For example, the user input may include various types of information input into the electronic device 100 such as a gesture, a vocal command, a movement of a pupil, a biometric signal, and the like, in addition to the touch. The controller 110 may control a predetermined operation or function corresponding to the detected user input to be performed.

The functional units and modules in the exemplary embodiments of may indicate a functional or structural coupling of hardware for executing and software for operating the hardware. For example, the functional units may refer to a code and a unit of logic of a hardware resource for performing the code. However, it will be understood by a person skilled in the technical field of the present disclosure that the each functional unit may not mean the physically edited codes, or a kind of hardware.

Figure 2:
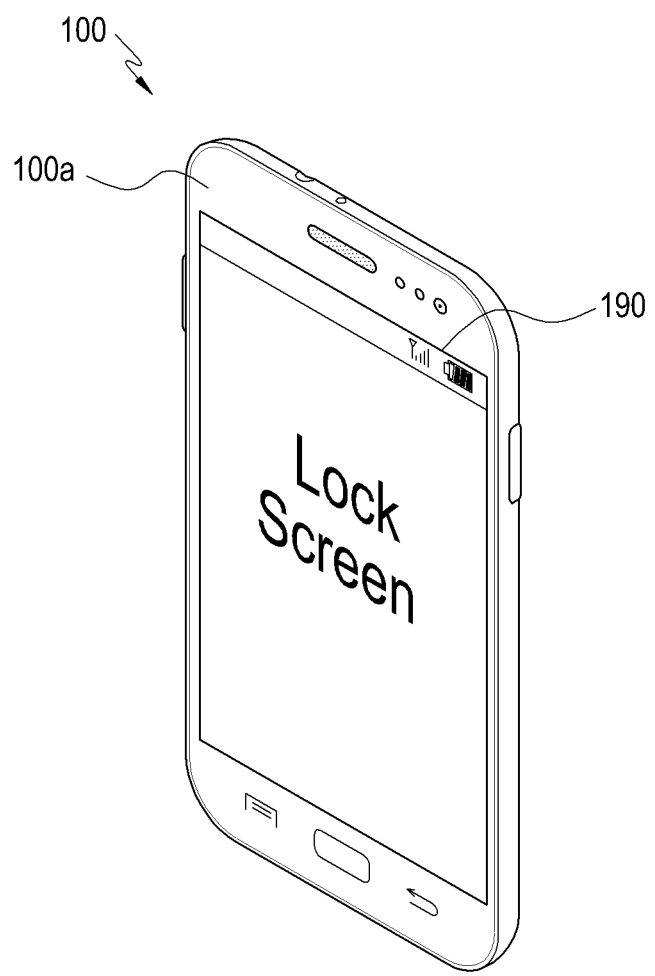
FIGS. 2 and 3 are front perspective views of an electronic device according to exemplary embodiments.
Figure 3:
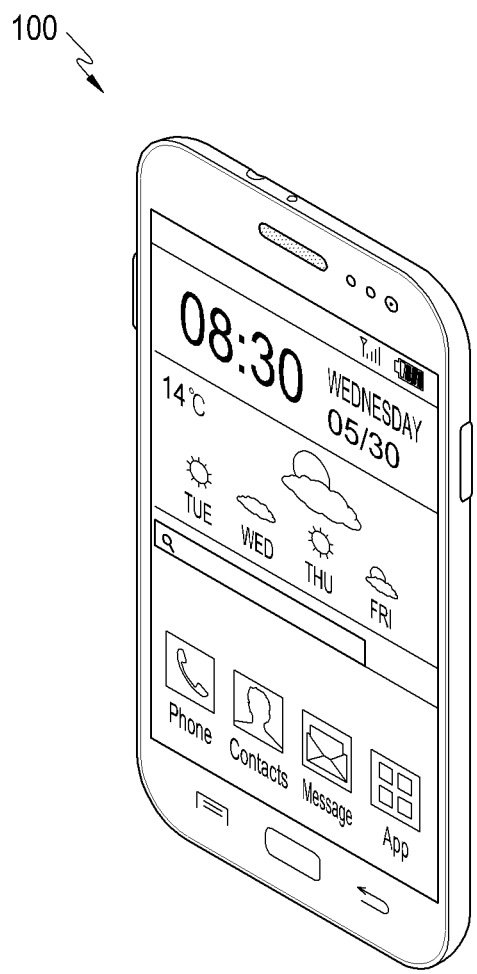

FIGS. 2 and 3 are front side perspective views of an electronic device according to exemplary embodiments.

Referring to FIGS. 2 and 3, the touch screen 190 is disposed on a front side 100*a* of the electronic device 100. In this example, the touch screen 190 has a size large enough to cover most of the front side 100*a* of the display device 100. In FIG. 2, a lock screen is currently being displayed on the touch screen 190. The lock screen may be the first screen displayed on the touch screen 190 when the electronic device 100 is turned on, and may provide an environment accessible to the device 100 by inputting security information, for example, a password, a security pattern, and the like, set by a user. The controller 110 determines the validity of security information which is input by a user, and executes or otherwise performs unlocking to switch the screen from the locked screen to a home screen as shown in FIG. 3.

The lock screen may also receive a handwritten signature, a password, a security pattern, and the like. When a user does not set separate security information, the lock screen may be switched into a home screen by a touch input or a drag input of the user, without receiving security information such as a handwritten signature, a password, a security pattern, and the like.

In some examples, the home screen may include multiple pages of different home screens. The first page of the home screen may be a main home screen. On the home screen, shortcut icons for executing frequently used applications, a main menu switch key, a time, weather information, and the like may be displayed. The main menu switch key may enable a menu screen to be displayed on the touch screen 190.

Figure 4:
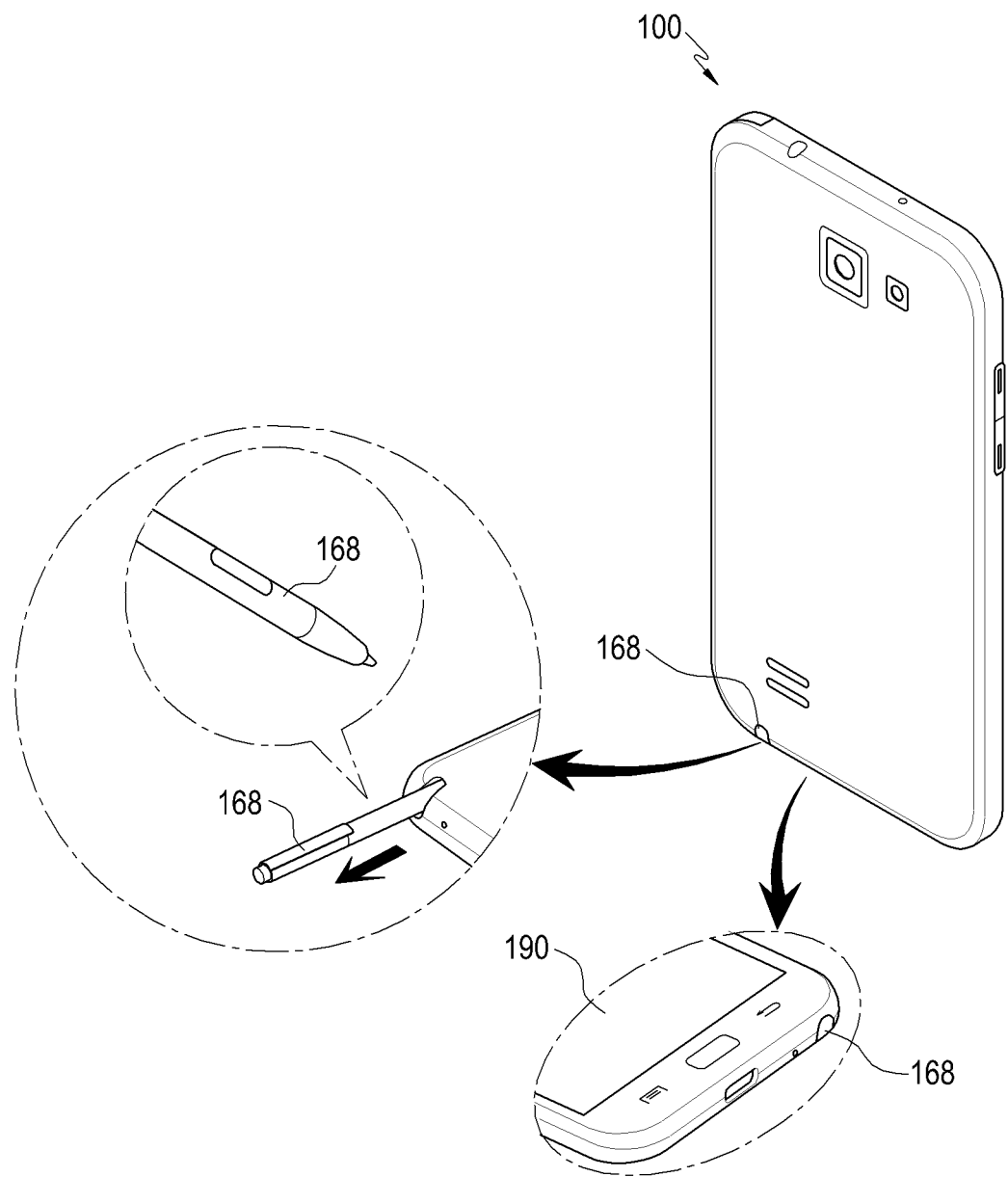
FIG. 4 is a back side perspective view of an electronic device according to an exemplary embodiment.

FIG. 4 illustrates a back side perspective view of an electronic device according to an exemplary embodiment.

The input unit 168 may be inserted into the electronic device 100, and may be stored inside the electronic device 100. In the example of FIG. 4, the input unit 168 is installed in a lower lateral side of the electronic device 100, and may be taken out or separated from the electronic device 100 for use. For example, the input unit 168 may include a stylus or a pen. Although FIG. 4 exemplifies a case in which the input unit 168 is installed in the lower lateral side, the location of the installation is not limited thereto.

Figure 5:
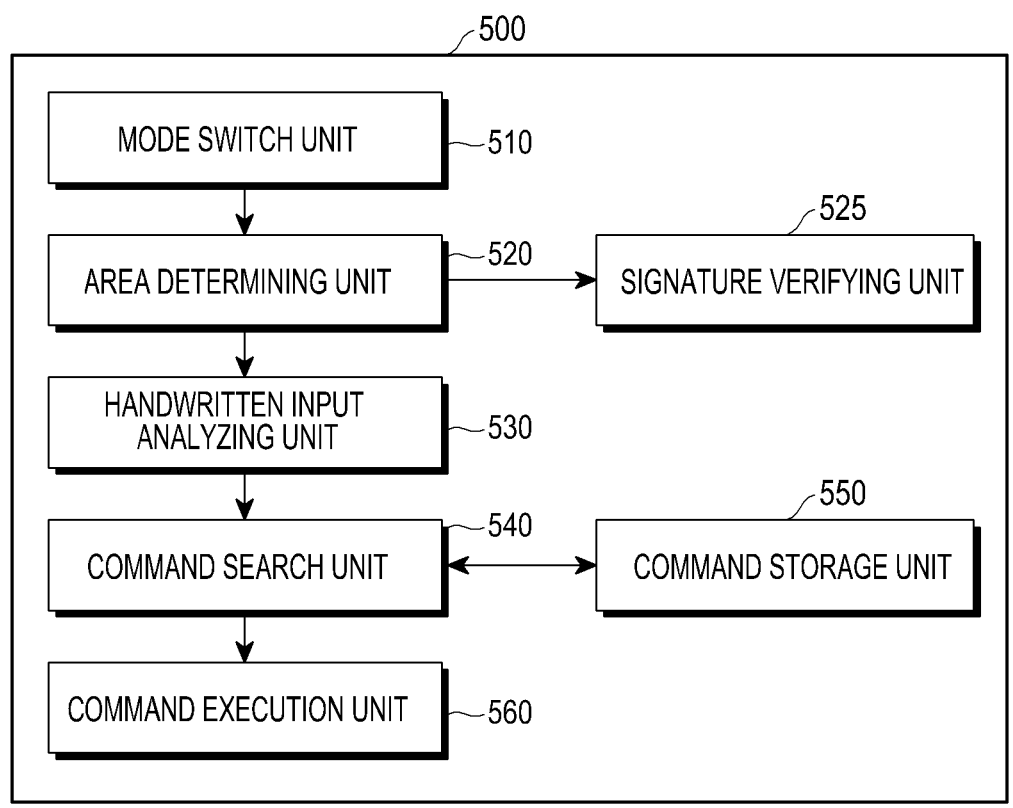
FIG. 5 is a block diagram illustrating an apparatus for executing a function associated with a handwritten user input on a lock screen according to an exemplary embodiment.

FIG. 5 is a block diagram illustrating an apparatus for executing a function associated with a handwritten user input on a lock screen according to an exemplary embodiment.

Referring to FIG. 5, apparatus 500 includes a mode switch unit 510, an area determining unit 520, a signature verifying unit 525, a handwritten input analyzing unit 530, a command search unit 540, a command storage unit 550, and a command execution unit 560.

The mode switch unit 510 may execute a function of switching a current mode to an input mode on a screen to enable a user to input a handwritten character through a user input means such as the input unit 168, a finger, and the like. For example, a user input for activating the electronic device 100 where a screen is turned off or locked may be sensed when a home button is pressed, a power/lock button is pressed, and the like, and the mode switch unit 510 may execute switching the current mode into the input mode. In an example in which a lock function is set, the lock screen may be displayed when the current mode is switched into the input mode.

When the current mode is switched by the mode switch unit 510 into the input mode for recognizing a handwritten input, an area input or selected by the user on the lock screen may be determined, and related functions may be executed in response to a user input provided through the determined area. For example, inputting a handwritten character may be performed after switching the mode into the input mode through the mode switch unit 510, but the present disclosure may not be limited thereto. That is, the functions according to an embodiment of the present disclosure may be executed without a separate mode switching process.

Figure 6A:
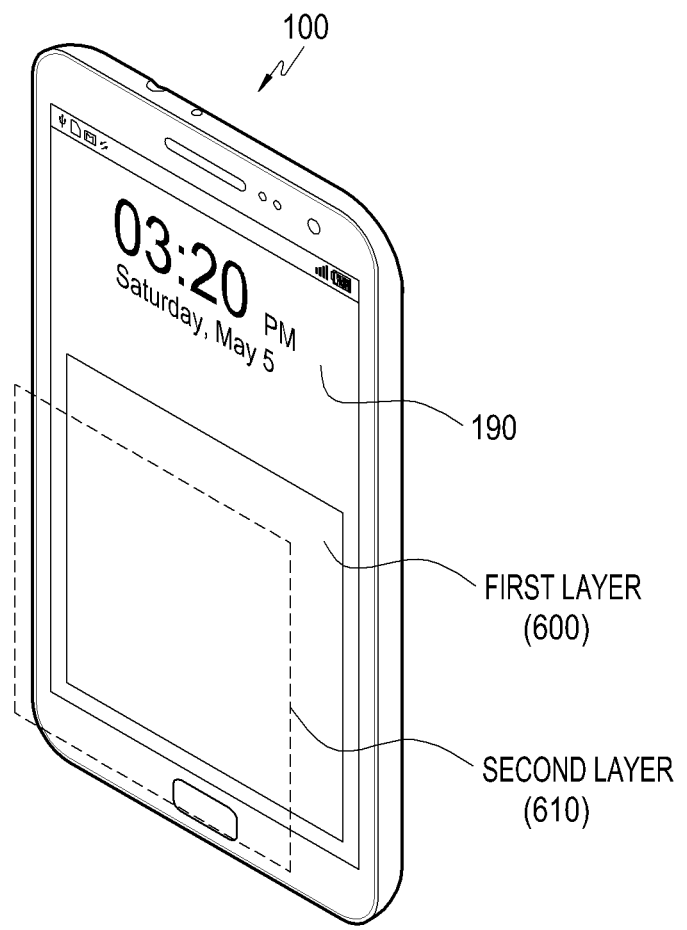
FIG. 6A illustrates a lock screen that has a layered structure according to an exemplary embodiment.

The area determining unit 520 may determine an area where an input is generated by a user input means. According to various aspects, a lock screen displayed on the touch screen 190 may include a first layer 600 for receiving an unlock command, and a second layer 610 that is laid over the first layer 600 and which is used for receiving a handwritten user input, as shown in FIG. 6A. The first layer 600 may be disposed in an area of a predetermined size on the lock screen, and the second layer 610 may have the same size as the first layer 600. The area of the predetermined size may be the remaining area excluding the area where time information and the like is displayed. As another example, the area may be set to be identical to the size of the entire lock screen, for example, the size of the touch screen 190, but the size and the shape of the area are not limited thereto.

Figure 6B:
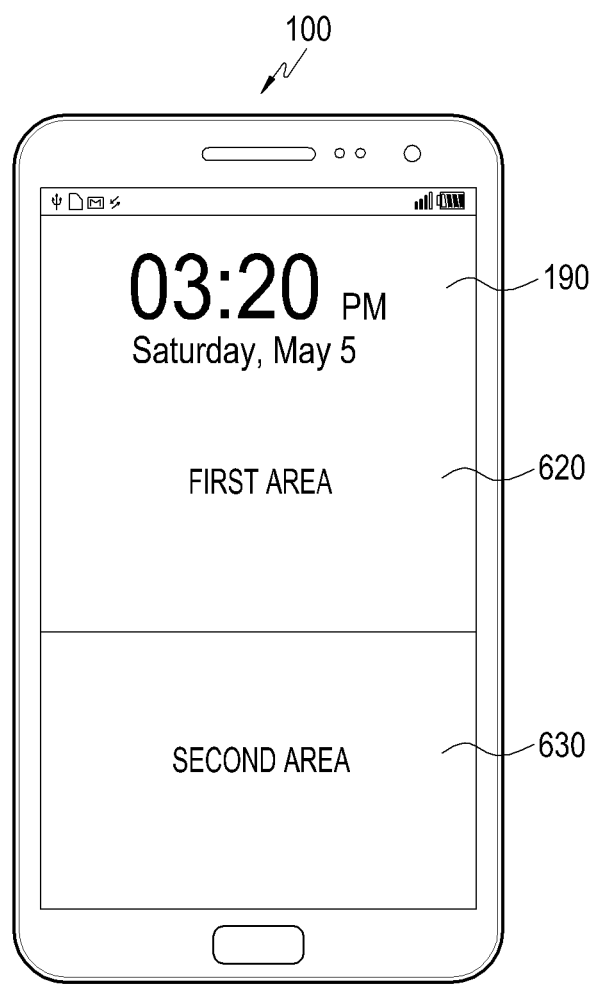
FIG. 6B illustrates a lock screen based on divided area scheme according to an exemplary embodiment.

The lock screen displayed on the touch screen 190 according to another exemplary embodiment may be divided into a plurality of areas. As shown in FIG. 6B, for example, the lock screen may be divided into a first area 620 for receiving an unlock command and a second area 630 for receiving a handwritten user input. In this example, the first and second areas 620 and 630 do not overlap, however, in some examples the areas may overlap, and there may be more than two areas.

Although FIG. 6B exemplifies a case in which the touch screen 190 is divided into two areas 620 and 630 by a line that crosses the entire screen, the shapes of the first area 620 and the second area 630 and the ways of distinguishing them are not limited thereto. For example, the first area 620 may be provided in a circular shape, the remaining area excluding the first area 620 may be determined as the second area 630. Also, the first area 620 or the second area 630 may be provided in various shapes such as an oval shape, a rectangular shape, a square shape, and the like.

When a user input is provided through the first layer 600 or the first area 620 which are used for receiving an unlock command, the signature verifying unit 525 analyzes an unlock command input through the first layer 600 or the first area 620. For example, the signature verifying unit 525 may compare a reference signature that a user has previously registered as an unlock command, with a handwritten signature input through the first layer 600 or the first area 620, to verify the handwritten signature is the same as the reference signature. That is, the signature verifying unit 525 may determine whether the handwritten signature is the same as the reference signature. When the verification of the handwritten signature is successful, an operation such as unlocking or the like may be executed. For example, the signature verifying unit 525 may compare the handwritten signature to the reference signature and determine how close the handwritten signature is to the reference signature. If the handwritten signature is determined to be within a predetermined likeness to the reference signature, the signature verifying unit 525 may determine that the handwritten signature corresponds to the reference signature.

The handwritten input analyzing unit 530 analyzes a user input character input by the user input through the second layer 610 or the second area 630. In this example, the handwritten input analyzing unit 530 may identify a character or a symbol that matches the user input, by including a means for identifying the handwritten input. For example, the handwritten input analyzing unit 530 may compare the handwritten input by the user to a plurality of potential characters. If the handwritten input is determined to be within a predetermined likeness a character, the handwritten input analyzing unit 530 may determine that the handwritten input corresponds to the character.

The command search unit 540 searches for a command corresponding to the character (or symbol) identified by the handwritten input analyzing unit 530, for example, using a mapping table stored in the storage unit 550. The command may include any type of command that instructs execution of a predetermined function in the electronic device 100. For example, the command may include execution of a predetermined application installed in the electronic device 100, execution of a predetermined function included in the application together with the execution of the application, and the like.

The command storage unit 550 may map commands to corresponding handwritten characters, respectively. For example, an execution command for a camera may be mapped to a handwritten character, 'C', and may be stored in the command storage unit 550.

The command execution unit 560 executes a command retrieved by the command search unit 540. For example, when the verification of the handwritten signature through the signature verification unit 525 is successful, the command execution unit 560 may execute an unlocking operation of the display screen, and simultaneously display a screen corresponding to the command input by the user in the second layer 610 or the second area 630 and retrieved by the command search unit 540.

Meanwhile, component elements of the device 500 are separately illustrated to indicate that they may be functionally and logically separated from each other, but this does not mean that the component elements are necessarily separate component elements or implemented as separate codes.

Figure 7:
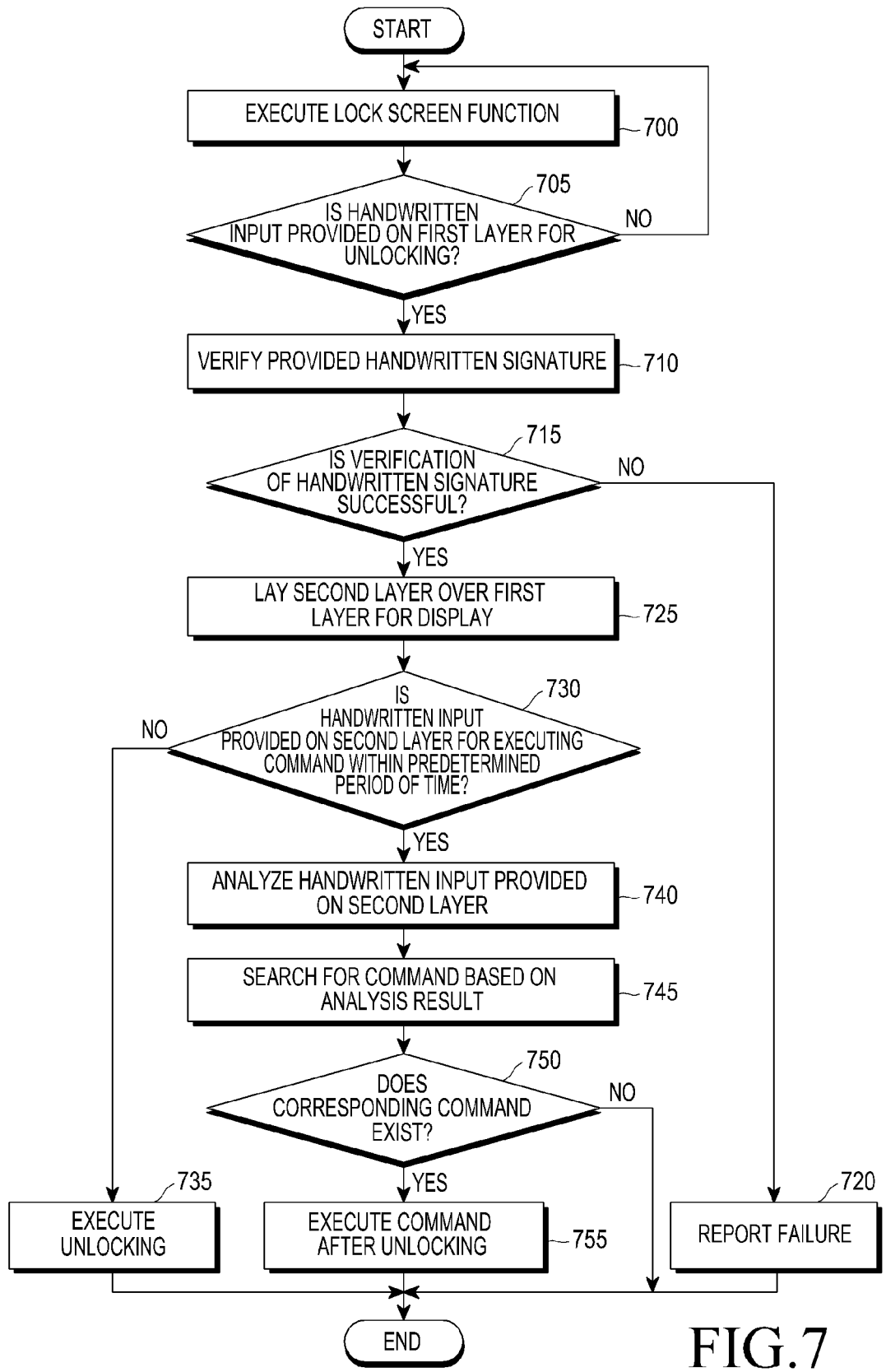
FIG. 7 is a flowchart illustrating a method for executing a function associated with a handwritten user input on a lock screen having a layered structure, according to an exemplary embodiment.

FIG. 7 is a flowchart illustrating a method for executing a function associated with a handwritten user input on a lock screen that has a layered structure according to an exemplary embodiment. Hereinafter, descriptions are provided with reference to FIGS. 9A through 9C of a configuration of a screen for inputting a signature and a handwritten character, symbol, and shape. However, the exemplary embodiments are not limited to these examples.

Figure 9A:
FIGS. 9A through 9C illustrate a screen that shows a handwritten unlock command and a handwritten user input according to an exemplary embodiment.

Referring to FIG. 7, a lock screen function is executed in operation 700 to lock the screen, for example, based on a user command. Next, the electronic device 100 determines whether a handwritten input is generated on a first layer 900 for unlocking the lock screen, in operation 705. When a handwritten input is generated by a user on the first layer 900, a handwritten signature through the first layer 900 is verified in operation 710. For example, when a lock screen is displayed as shown in FIG. 9A, and a handwritten signature 910 is input by a user, such as by applying a pen, a finger, or the like, to the first layer 900, the input handwritten signature may be analyzed. Accordingly, a previously registered handwritten signature and the input handwritten signature 910 may be compared to determine whether they are the same and verify the authenticity of the input handwritten signature 910, in operation 715.

When the verification of the handwritten signature is successful in operation 715, the electronic device 100 proceeds with operation 725, and when the verification fails, the electronic device 100 reports failure in operation 720 and outputs a message reporting the failure.

Figure 9B:

Conversely, when the verification of the handwritten signature is successful, the electronic device 100 lays the second layer 920 over the first layer 900 for display as shown in FIG. 9B, in operation 725. In this example, the second layer 920 may be laid over the first layer 900, and may have a similar or a same size as the first layer 900. As an example, the second layer 920 may be filled with a background color so that the handwritten signature 910 input to the first layer 900 is not visible. Alternatively, the background color may be transparent or opaque, and the handwritten signature 910 input to the first layer 900 may be displayed through the second layer 920. That is, the second layer 920 may have a background color that is transparent or opaque allowing the handwritten signature 910 to be seen by the user. As described above, security of the handwritten signature may be obtained by displaying a handwritten user input 930 which is drawn over the handwritten signature 910. Also, the handwritten user input may be input at an area in which the handwritten signature is input, and thus, a more natural handwriting effect may be obtained.

The electronic device 100 determines whether a handwritten input for executing a command is generated through the second layer 920 within a predetermined period of time from when the second layer 920 is displayed, in operation 730. For example, if an amount of time elapses while waiting for a handwritten input to the second layer 920 exceeds a predetermined period of time, the electronic device 100 executes unlocking in operation 735. Accordingly, if an additional handwritten input for executing a command is not detected in the second layer 920, the electronic device determines that an input for executing an application on the lock screen is not received. Accordingly, the electronic device 100 may execute an unlocking operation, and simultaneously display a home screen or load a recently used application so as to display an execution screen of the application.

Conversely, when a handwritten input for executing a command is received on the second layer 920 within the predetermined period of time in operation 730, the electronic device 100 analyzes the handwritten input in operation 740. For example, a handwritten user input 930 such as, a character, a symbol, a shape, and the like, may be input to the second layer 920 by a user input means, as shown in FIG. 9B. Accordingly, the electronic device 100 may analyze the shape of the handwritten input for identification.

Figure 9C:
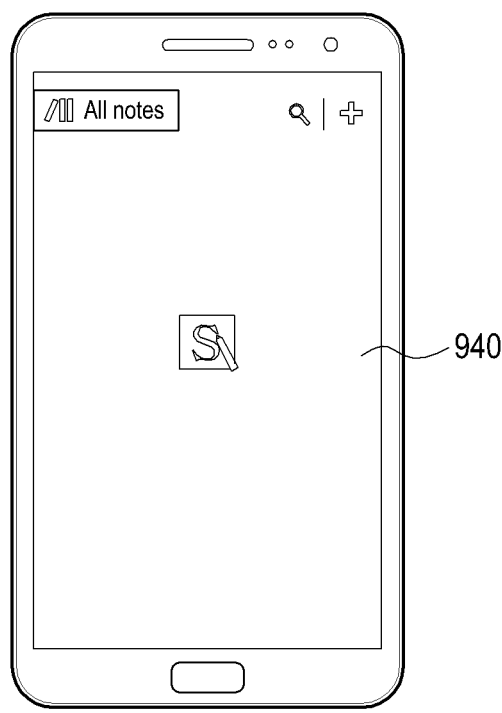

The electronic device 100 searches for a command corresponding to the character, symbol, or shape received and identified through the analysis, from commands stored in advance, in operation 745. For example, the electronic device 100 may search for a command corresponding to the identified character in a table stored that is stored in advance, in operation 745, and when the command exists, execute an unlocking operation and also execute the command corresponding to the identified character, in operation 750. For example, if the device determines that a character 'N' is input to the second layer 920 by the user in a handwritten form, as illustrated in FIG. 9B, the handwritten input analyzing unit 530 identifies the input handwritten character as the character 'N', and the command search unit 540 executes a note program which corresponds to the identified character 'N'. Accordingly, a note program execution screen 940 may be displayed at the same time as unlocking, as shown in FIG. 9C.

Figure 8:
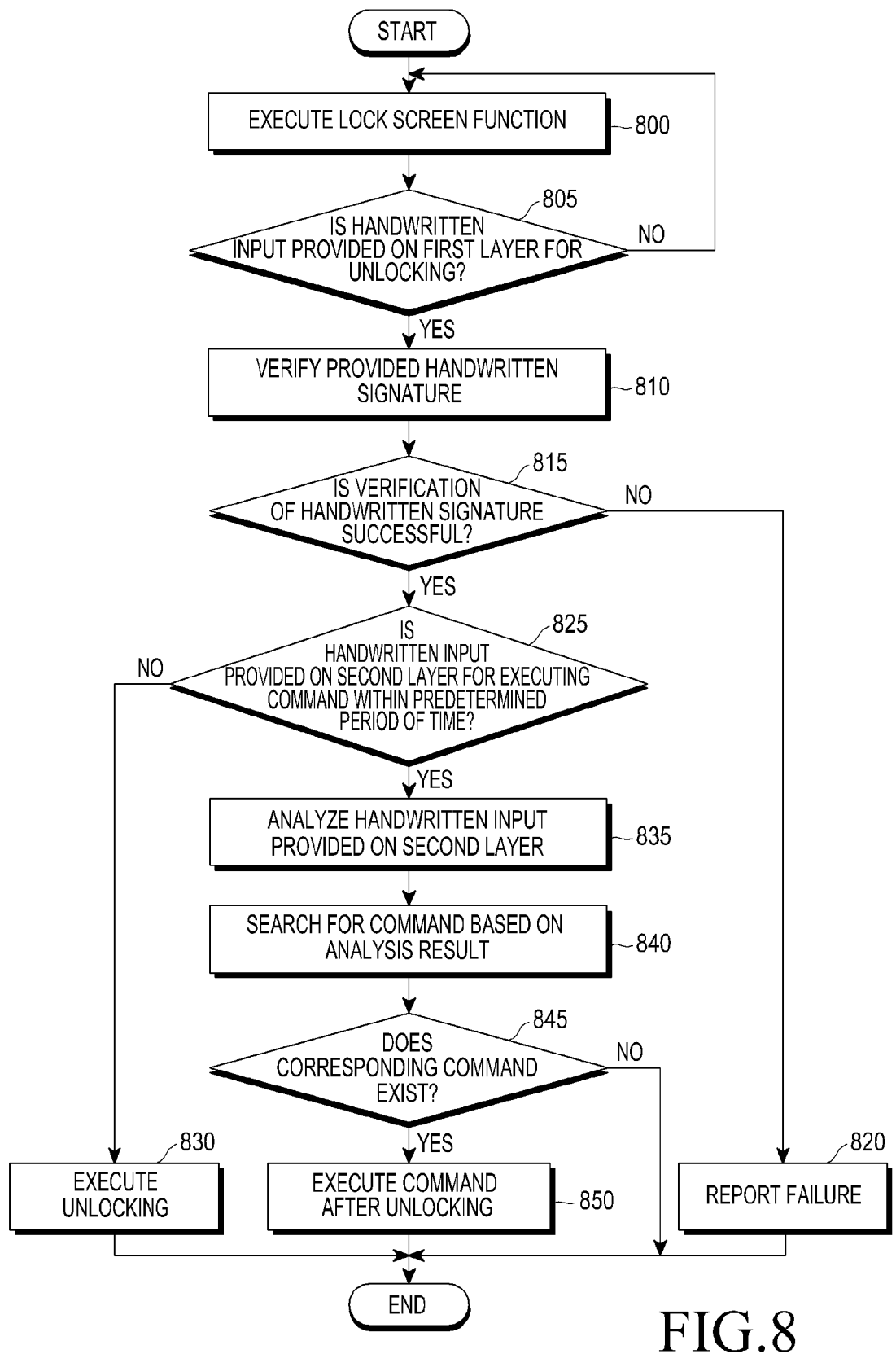
FIG. 8 is a flowchart illustrating a method for executing a function associated with a handwritten user input on a lock screen based on a divided area scheme, according to an exemplary embodiment.

FIG. 8 is a flowchart illustrating a method for executing a function associated with a handwritten user input on a lock screen based on an area division scheme, according to an exemplary embodiment. Hereinafter, although the examples are provided with reference to FIGS. 10A through 10C for a configuration of a screen for inputting a signature and a handwritten character. It should be appreciated that the exemplary embodiments are not limited thereto.

Figure 10A:
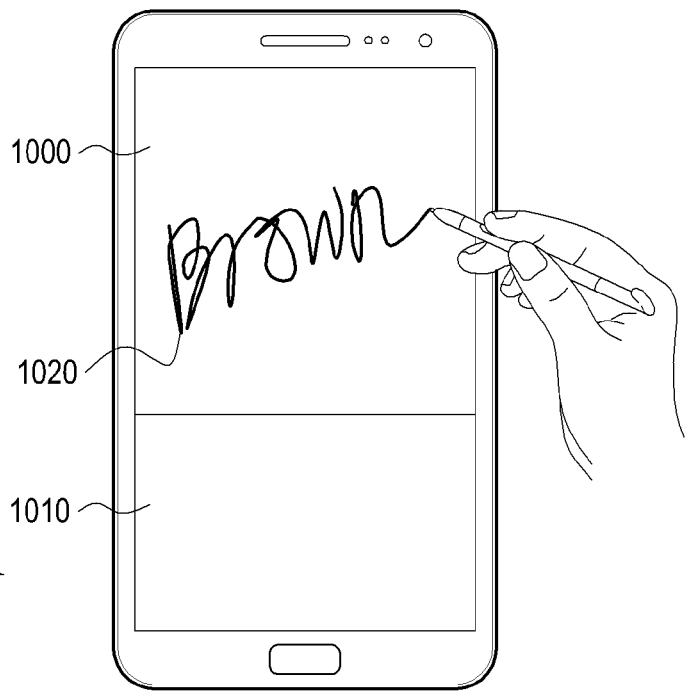
FIGS. 10A through 10C illustrate a screen that shows a handwritten unlock command and a handwritten user input according to another exemplary embodiment.
Figure 10B:
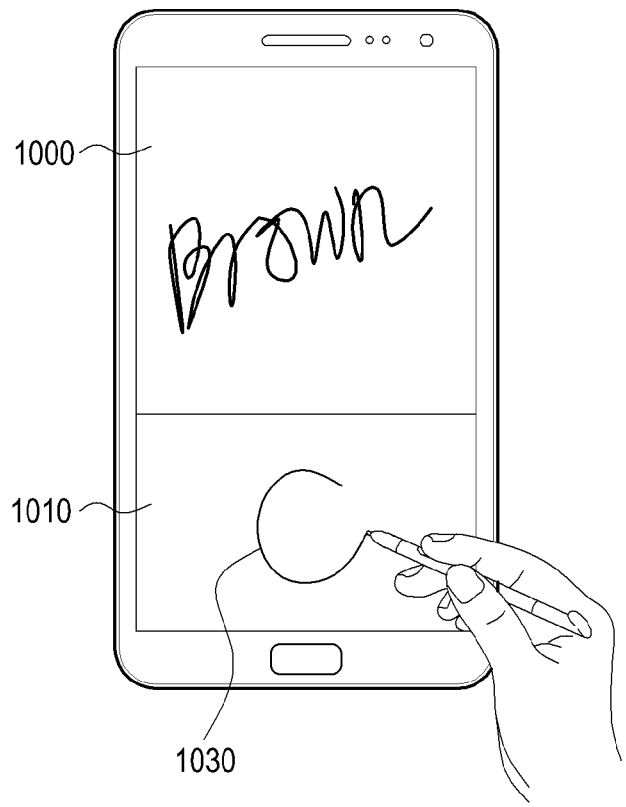

Referring to FIG. 8, in a state in which a lock screen function is executed in operation 800, the electronic device 100 determines whether a handwritten input is generated on a first area 1000 that is used for unlocking, in operation 805. When a handwritten input is generated on the first area 1000, a handwritten signature input through the first area 1000 is verified in operation 810. For example, the lock screen may be divided into the first area 1000 and a second area 1010 as shown in FIG. 10A, and a handwritten signature 1020 may be input by a user input means to the first area 1000. Accordingly, the input handwritten signature may be analyzed. That is, a registered handwritten signature and the input handwritten signature may be compared to determine whether they are the same and thus, verify the authenticity of the input handwritten signature.

When it is determined that the verification of the handwritten signature is successful in operation 815, the electronic device 100 proceeds with operation 825, and when it is determined that the verification fails, the electronic device 100 reports failure in operation 820. Accordingly, the electronic device 100 outputs a message reporting the failure.

Conversely, if the verification is successful, the electronic device 100 determines whether a handwritten input for executing a command is generated on the second area 1010 within a predetermined period of time, in operation 825. For example, the predetermined period of time may be 1 second, 3 seconds, 5 seconds, 10 seconds, 20 seconds, and the like.

When the predetermined amount of time passes for waiting for a handwritten input in the second area 1010, the electronic device 100 executes an unlocking command in operation 830. That is, when a further handwritten input by the user for executing a command is not detected within the second area 1010, it is determined that an input for executing an application on the lock screen has not been received. Accordingly, the electronic device 100 executes the unlocking command, and simultaneously displays a home screen or loads a recently used application so as to display an execution screen of the application.

Conversely, when a handwritten input for executing a command is generated on the second area 1010 within the predetermined period of time, in operation 825, the electronic device 100 analyzes the handwritten input provided on the second area 1010, in operation 835. For example, a handwritten character 1030 is input to the second area 1010 of FIG. 10B by a user input means, and the electronic device 100 analyzes the input handwritten character for identification. In this example, the handwritten character corresponds to the letter 'c.'

Figure 10C:
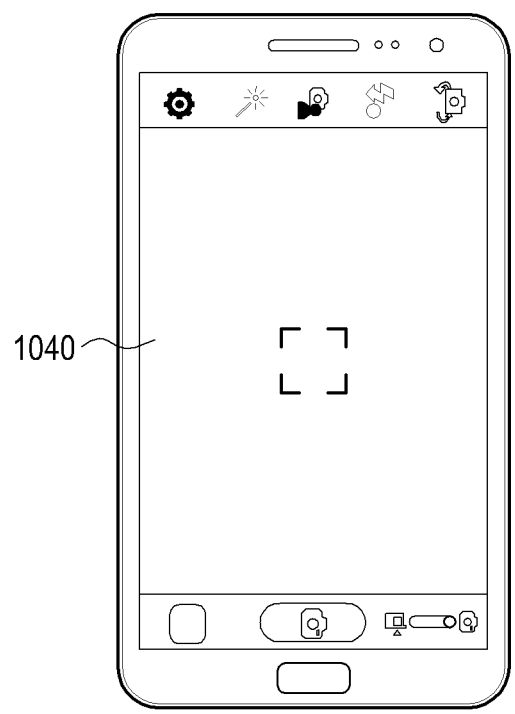

Subsequently, the electronic device 100 searches for a command corresponding to the character identified by analyzing commands stored in advance, in operation 840. In this example, the electronic device 100 searches for the command corresponding to the identified character from a table stored in advance, and when the electronic device determines the command exists in operation 845, executes an unlocking command and also executes the command corresponding to the identified character, in operation 850. For example, the handwritten input analyzing unit 530 identifies the input handwritten character as the character 'c' in the example of FIG. 10B, and the command search unit 540 may execute a camera program which corresponds to the identified character 'c'. Accordingly, a camera program execution screen 1040 is displayed at the same time as an unlocking operation is performed, as shown in FIG. 10C.

Figure 11:
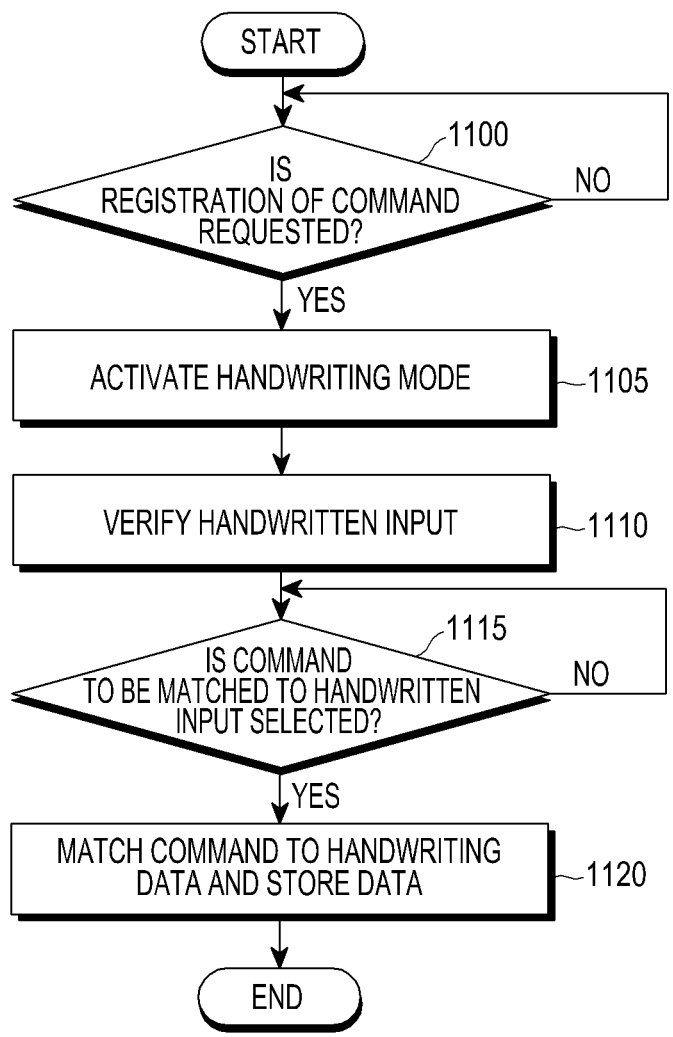
FIG. 11 is a flowchart illustrating a method for setting a handwritten command according to an exemplary embodiment.

FIG. 11 is a flowchart illustrating a method for setting a handwritten command according to an exemplary embodiment.

Referring to FIG. 11, the electronic device 100 determines whether a command registration request is requested in operation 1100, and in response to receiving the command registration request, displays a screen for registering a command. Subsequently, the electronic device 100 activates a handwriting mode in operation 1105, and detects a handwritten input provided by a user via for example a pen or a finger in operation 1110. In operation 1115, it is determined whether there is a command to be matched to the handwritten input. When there is a command to be matched to the handwritten input, the selected command is matched to the handwriting data and is stored in operation 1120.

FIG. 12 illustrates a table including handwriting commands according to an exemplary embodiment. FIG. 12 illustrates an example of a plurality of handwritten characters and commands for executing functions corresponding to the plurality of handwritten characters which are matched respectively. For example, the table may be stored in the storage unit 175 shown in FIG. 1. The command may include any type of command that instructs execution of a function in the electronic device 100. As another example, the command may include execution of a predetermined application installed in the electronic device 100, execution of a predetermined function included in an application together with the execution of the application, and the like.

As illustrated in FIG. 12, the handwriting data can correspond to a character or a symbol that is drawn by a user and that is included in a literal symbol system, and may be generated, deleted, cancelled, stored, and modified by a user input means. The handwriting data may be represented in a form of text such as the letter 'c' to indicate execution of a camera program, and may be formed of an image, such as a symbol or the like, for representing an application or for readily identifying the application, or may be formed of text, such as a logo or the like. The handwriting data may be in a text form for identifying a command, and may include a title that describes a feature of the command.

The exemplary embodiments of the present disclosure may be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. The storage unit included in the electronic device is one example of machine-readable storage media suitable for storing a program or programs including commands for implementing various embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device.

Further, the electronic device can receive the program from a program providing apparatus connected to the device wirelessly or through a wire and store the received program. The program providing apparatus may include a memory that stores a program, and the like, including instructions to perform a method of executing a function relating to a user input having a writing form on the lock screen, a communication unit that performs wired or wireless communication with the electronic apparatus, and a controller that performs a control to transmit a corresponding program to the electronic apparatus automatically or under a request of the electronic apparatus.

Although specific embodiments are described in the above description of the present disclosure, various modifications can be made without departing from the scope of the present disclosure. Accordingly, the scope of the present disclosure shall not be determined by the above-described embodiments, and is to be determined by the following claims and their equivalents.

What is claimed is:

1. An apparatus for executing a function associated with a handwritten input on a lock screen, the apparatus comprising:
   a touch screen configured to display a lock screen comprising a first layer and a second layer that is laid over the first layer; and
   a controller configured to
      control the touch screen to display the first layer of the lock screen,
      receive an unlock command via the touch screen,
      control the touch screen to display the second layer of the lock screen when the unlock command is the same as a predetermined unlock command, receive a handwritten input via the touch screen,
      search for a command corresponding to the handwritten input when the handwritten input is received within a predetermined period of time after displaying the second layer of the lock screen, and
      execute the command corresponding to the handwritten input.

2. The apparatus of claim 1, wherein the first layer is disposed on an area of a predetermined size in the lock screen, and the second layer comprises a same size as the first layer and is laid over the first layer.

3. The apparatus of claim 1, wherein the second layer comprises a transparent background color and the unlock command input to the first layer is displayed through the second layer.

4. The apparatus of claim 1, wherein the unlock command comprises a handwritten signature.

5. The apparatus of claim 4, wherein, in response to the handwritten signature being input, the controller is configured to verify the input handwritten signature based on a handwritten signature registered in advance.

6. The apparatus of claim 1, wherein the controller is configured to display a screen associated with the command corresponding to the handwritten input received on the second layer of the lock screen.

7. The apparatus of claim 1, further comprising:
   a storage configured to store a table comprising a plurality of handwritten inputs that are matched to a plurality of respective commands for executing functions corresponding to the plurality of handwritten inputs.

8. The apparatus of claim 7, wherein the controller is configured to search through the table for a command corresponding to the handwritten input.

9. The apparatus of claim 1, wherein the command comprises execution of a predetermined application installed in the apparatus, or execution of a predetermined function of the application together with the execution of the application.

10. The apparatus of claim 1, wherein the controller is configured to:
    determine whether the handwritten input is input to the second layer within a predetermined period of time after displaying the second layer of the lock screen, and
    unlock the lock screen on the touch screen, and display a screen corresponding to unlocking when the handwritten input is not received via the touch screen within the predetermined period of time.

11. A method of executing a function associated with a handwritten input on a lock screen, the method comprising:
    displaying a first layer of a lock screen on a touch screen;
    receiving an unlock command via the touch screen;
    displaying a second layer of the lock screen on the touch screen when the unlock command is the same as a predetermined unlock command;
    receiving a handwritten input via the touch screen;
    searching for a command corresponding to the handwritten input when the handwritten input is received within a predetermined period of time after displaying the second layer of the lock screen; and
    executing the command corresponding to the handwritten input.

12. The method of claim 11, wherein the first layer is disposed on an area of a predetermined size in the lock screen, and the second layer comprises a same size as the first layer and is laid over the first layer.

13. The method of claim 11, wherein the second layer comprises a transparent background color and the unlock command input to the first layer is displayed through the second layer.

14. The method of claim 11, wherein the unlock command comprises a handwritten signature.

15. The method of claim 14, further comprising:
in response to a handwritten signature being input through the first layer, verifying the handwritten signature based on a handwritten signature registered in advance.

16. The method of claim 11, further comprising:
activating the second layer in response to a predetermined unlock command being input through the first layer.

17. The method of claim 11, further comprising:
displaying a screen associated with the command corresponding to the handwritten input received on the second layer.

18. The method of claim 11, further comprising:
storing a table comprising a plurality of handwritten inputs that are matched to a plurality of respective commands for executing functions corresponding to the plurality of handwritten inputs.

19. The method of claim 18, wherein the searching for a command corresponding to a handwritten input that is input through the second layer of the lock screen comprises:
searching through the table for a command corresponding to the handwritten input.

20. The method of claim 11, wherein the command comprises execution of a predetermined application installed in an electronic device, or execution of a predetermined function of the application together with the execution of the application.

21. An apparatus for executing a function associated with a handwritten input on a lock screen, the apparatus comprising:
a touch screen configured to display a lock screen; and
a controller configured to
control the touch screen to display the lock screen,
receive an unlock command via the touch screen,
control the touch screen to receive a handwritten input on the displayed lock screen when the unlock command is the same as a predetermined unlock command,
search for a command corresponding to the handwritten input when the handwritten input is received on the displayed lock screen within a predetermined period of time after determining that the unlock command is the same as the predetermined unlock command, and
execute the command corresponding to the handwritten input.

* * * * *